US011106669B2

(12) United States Patent
Lutz et al.

(10) Patent No.: US 11,106,669 B2
(45) Date of Patent: Aug. 31, 2021

(54) BLOCKING NATURAL PERSONS DATA IN ANALYTICS

(71) Applicant: SAP SE, Walldorf (DE)

(72) Inventors: Raffael Lutz, Bad Schoenborn (DE); Sonja Barnet, Viernheim (DE); Stefan Kraus, Bruchsal (DE); Dirk Baumgaertel, Altlussheim (DE); Jan Matthes, Darmstadt (DE); Vivek Methi, Anjangaon Surji (IN); Gaurav Kumar, Madhepura Bihar (IN)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 16/381,980

(22) Filed: Apr. 11, 2019

(65) Prior Publication Data

US 2020/0327126 A1    Oct. 15, 2020

(51) Int. Cl.
*G06F 16/248* (2019.01)
*G06F 16/2453* (2019.01)
*G06F 16/28* (2019.01)

(52) U.S. Cl.
CPC ...... *G06F 16/24535* (2019.01); *G06F 16/248* (2019.01); *G06F 16/283* (2019.01); *G06F 16/289* (2019.01)

(58) Field of Classification Search
CPC ............. G06F 16/24535; G06F 16/289; G06F 16/283; G06F 16/248
See application file for complete search history.

(56) References Cited

U.S. PATENT DOCUMENTS

| | | | |
|---|---|---|---|
| 8,826,370 B2 | 9/2014 | Boukobza | |
| 8,856,157 B2 | 10/2014 | O'Byrne | |
| 8,930,381 B2 | 1/2015 | Raghunathan et al. | |
| 9,141,332 B2 | 9/2015 | Coleman et al. | |
| 2007/0136237 A1 | 6/2007 | Barker et al. | |
| 2008/0120296 A1* | 5/2008 | Kariathungal | G16H 10/60 |
| 2013/0066893 A1 | 3/2013 | Humprecht | |
| 2014/0380489 A1 | 12/2014 | Hacid et al. | |
| 2015/0248222 A1* | 9/2015 | Stickler | G06Q 10/06 |
| | | | 715/763 |
| 2018/0004978 A1 | 1/2018 | Hebert et al. | |
| 2018/0218163 A1 | 8/2018 | Ananthapur Bache et al. | |
| 2018/0218168 A1* | 8/2018 | Goel | H04L 9/3239 |

(Continued)

*Primary Examiner* — Kyle R Stork
(74) *Attorney, Agent, or Firm* — Mintz Levin Cohn Ferris Glovsky and Popeo, P.C.

(57) ABSTRACT

In one aspect, a method is described that includes receiving, at a data warehouse, a query associated with a view for a report being presented at a client device user interface; processing, by the data warehouse, the query to identify data responsive to the query; evaluating the identified responsive data to determine whether there is corresponding metadata indicating a portion of the identified responsive data includes blocked natural persons data; when the blocked natural persons data is determined, evaluating the corresponding metadata to determine whether the block is a total block or a partial block; generating, based on the evaluated metadata, a result set including a predetermined value to mask the blocked natural persons data; and providing the generated result set including the predetermined result set to a server handling the view. Related systems, methods, and articles of manufacture are also disclosed.

19 Claims, 10 Drawing Sheets

(56) References Cited

U.S. PATENT DOCUMENTS

2018/0276402 A1\* 9/2018 Allen .................. G06F 21/6263
2018/0285591 A1\* 10/2018 Thayer ................ G06F 21/6245
2018/0349453 A1\* 12/2018 Khatri ................. G06F 16/2282

\* cited by examiner

BLOCKING NATURAL PERSONS DATA IN ANALYTICS

BACKGROUND

To comply with certain privacy laws such as the General Data Protection Regulation (GDPR), data about a natural person may need to be protected and kept private within a company's systems. Often, deletion of the natural person's data is possible, but the deletion is not permitted in order to comply with other laws requiring companies to keep certain records about its employees (e.g., for law enforcement purposes, taxation, and the like). Thus, the management of data associated with a natural person (which refers to a human being rather than a corporation or company) may be extremely complex given the volume of natural persons data with company systems as well as the various different locations natural persons data can be found.

SUMMARY

In one aspect, a method is described that includes receiving, at a data warehouse, a query associated with a view for a report being presented at a client device user interface; processing, by the data warehouse, the query to identify data responsive to the query; evaluating the identified responsive data to determine whether there is corresponding metadata indicating a portion of the identified responsive data includes blocked natural persons data; when the blocked natural persons data is determined, evaluating the corresponding metadata to determine whether the block is a total block or a partial block; generating, based on the evaluated metadata, a result set including a predetermined value to mask the blocked natural persons data; and providing the generated result set including the predetermined result set to a server handling the view.

In some variations, at least one or more of the following features may be included. The view may include a pre-defined database view stored at view model repository at the server separate from the data warehouse. The pre-defined database view may be configured to send one or more pre-defined queries to the data warehouse to obtain the result set. The processing may further include processing the query associated with the view to determine which data objects are needed to form the result set responsive to the query. The query may be a multi-dimensional query. The data objects may be structured in a star schema including a fact table and one or more dimension tables. The evaluation further may further include determining that the corresponding metadata includes a code value indicative of all of the data fields are to be blocked as the blocked natural persons data. The providing may include providing the result set including a predetermined value to indicate that the result set includes data corresponding to the blocked natural persons data. The data warehouse may include a multi-dimensional database and/or a database.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1A-FIG. 1B depict examples of user interfaces configured to initiate blocking of data associated with natural persons;

FIG. 5-FIG. 6 depict user interfaces for configuring blocking runs at a data warehouse containing blocked natural persons data;

DETAILED DESCRIPTION

As noted, laws such as General Data Protection Regulation (GDPR) may require data privacy officers to block usage of data about natural persons ("natural persons data") to prevent the display and other types of processing of the natural persons data in reports and the like. For example, a client device may generate a report that prevents blocked natural persons data from being viewed on a display of the client device. Although the report may exclude the natural persons data, other data may still be processed and displayed in the report, such that key figure data (which is not associated with the blocked natural persons data) remains accurate. Moreover, navigation to blocked natural person data may not be allowed, and sharing of the blocked natural persons data may not be allowed as well. The blocked natural persons data may be stored in a data warehouse, but any blocked natural persons data may not be accessed by client devices for reporting and other types of processing.

In some embodiments, there is provided metadata based solution to indicate in a data warehouse certain data considered to be associated with a blocked natural person.

In some embodiments, the data warehouse (which stores the natural persons data along with other data) may be configured in a star schema including at least one fact table that references at least one dimension table. The fact table may store facts (e.g., values, measurements, and foreign keys) for an event. The foreign keys point and thus map to dimension tables, at which the attributes associated with the facts of the fact table are stored.

In some embodiments, the complete record for a given natural person is blocked, such that the data warehouse limits access to data associated with other, non-blocked entities. In some embodiments, only some fields for the given natural person is blocked, but other fields associated with the given natural person may not be blocked.

In some embodiments, the metadata is used to determine the blocking for a given natural person. For example, a data model associated with the data at the data warehouse may be extended to include metadata indicative of the blocking of the natural persons data. To illustrate further, the metadata (which is associated with the natural persons data in the data warehouse) may be augmented (e.g., extended) to include information to enable the blocking of natural persons data.

Table 1 below depicts an example of the metadata being used to identify the type of blocking being performed for a given natural person. For a given view instance that includes data objects that need to be blocked, the data object may be associated with a code list as shown in Table 1. For a given view instance, the metadata for a given natural person may have no blocking (see, e.g., value "0"), which in some implementations may be a default setting for a natural person. For a given view instance, the metadata for a given natural person may block all fields (see, e.g., value "1"). For a given view instance, the metadata for a given natural person may instead block only some fields (see, e.g., value "2"), while not blocking one or more other fields. Lastly, the value of "3" may indicate that only some fields are masked. To illustrate further, the view (which is the result set from one or more queries on the data at the data warehouse) may correspond to a query on data objects having a given structure. For example, the structure may be in the form of objects including nodes (e.g., business objects), in which case at least one of the nodes (such as a root node for the objects) may include a code in accordance with the code list of Table 1 to enable a determination of whether the natural persons data should be allowed to be accessed or provided in response to the database view. In some embodiments, the view instance (also referred to herein as database view) is a multi-dimensional analytical view from an online analytical processing type system.

TABLE 1

| Value | Description |
|-------|-------------|
| 0 | None (Default) |
| 1 | Instance blocking + masking all fields |
| 2 | Instance blocking + masking some fields |
| 3 | Only masking some fields |

Referring to Table 1, when the code list has a value of 1 (instance blocking of natural person data including masking all associated fields for that blocked natural person), a view element, such as 3FILTER, is created. The visibility of the new code list field may be "HIDDEN" (e.g., a field that is a part of the "internal" data source model and can be used by the framework but are not visible to end-users). To illustrate further, a user interface may be used to assign a query definition (QDEF, which represents a query filter) field that contains information indicating whether an instance is blocked to the 3FILTER view element. The 3FILTER refers to a special, automatically generated view element that is marked as "Instance blocking+masking all fields". The 3FILTER field is used by the runtime but not shown to the (end) users. When the field 3FILTER has the value 'X,' the record will be removed from the result set. This new view element may be saved to the database, such as a data warehouse and the like. If the query definition (QDEF) field returns a given value, such as "X", the view instance is to be blocked.

When the code list has a value of 3 (instance blocking of natural persons data including masking of only some but not all associated fields for that blocked natural person), additional metadata may be used. For example, a group of fields that point to the same natural person may be defined. For each of these field groups, a new artificial view element 3FILTER_*is created and assigned to the corresponding QDEF field.

In some embodiments, the multi-dimensional analytical view may be configured to support operations, such as a union, join, anchor, etc. These operations may take into account the blocked natural persons metadata. In the case of a union multi-dimensional analytical view that performs a union operation of data objects, the union operation is configured to block data associated with blocked natural person(s). Specifically, the union operator excludes from the union result set the excluded blocked natural persons data that has been flagged in the metadata as blocked natural persons data. To illustrate further, the union multi-dimensional analytical view provides a multi-dimensional analytical view having a view element 3FILTER. This union multi-dimensional analytical view will get such a view element—the required mappings to the involved multi-dimensional analytical views will be generated accordingly.

As in the case with the union multi-dimensional analytical view, the join multi-dimensional analytical view may be configured to support the blocked natural persons metadata. For example, the join multi-dimensional analytical view provides a multi-dimensional analytical view having a view element 3FILTER also the view element will expose this view element. When the operation is the anchor multi-dimensional analytical view, the anchor multi-dimensional analytical view includes a view element 3FILTER. The 3FILTER view element of the join multi-dimensional analytical view is mapped to the 3FILTER view element of the anchor multi-dimensional analytical view; otherwise no blocking will be applied. When another join member has a view element 3FILTER, the join multi-dimensional analytical view exposes another view element 3FILTER_*. This view element 3FILTER_*may not support filtering. The DTA will expose the view elements 3FILTER but not 3FILTER_*. In case the field 3FILTER is requested, the result set for the view may be filled accordingly.

In case an extension field is added to a multi-dimensional analytical view having a type "1", this field will be masked as noted above with respect to Table 1. When the view element does not belong to a filter group, the content of the field will not be masked.

Regarding the multi-dimensional analytical view runtime, the join and union may push the data selection criteria down to the involved multi-dimensional analytical views. The view element 3FILTER may ensure that that all blocked instances are removed.

OLAP runtime (CL_MDRS_MDAV_RT_VPROV)
    KPI runtime (without OLAP)
    Value Help (Analytical Runtime/Crystal)
    Parameter handling (Analytical Runtime/OData/Crystal)
    Quick Filter (Analytical Runtime/OData)
    MDAV access (ODP/OData/CSV download)

The masking will be done in class CL_MDRS_MDAV_RT_DATA.

Figure 1A:
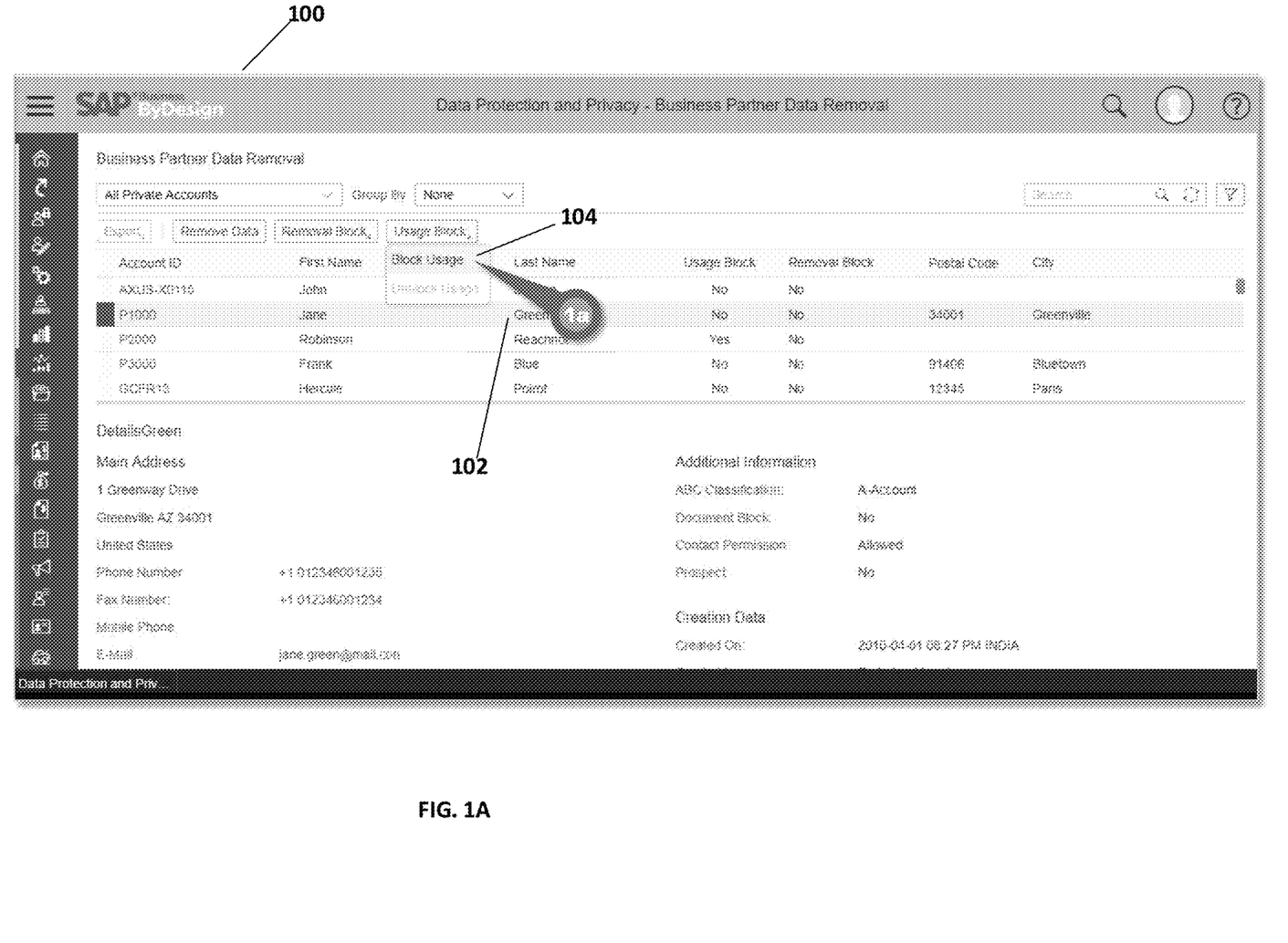

FIG. 1A depicts an example of a user interface 100 at which a natural person may be selected for blocking, such as Jane Green 102. In this example, the usage of data for the selected natural person such as Jane Green 102 is blocked such that usage of the data is not used for new processes (e.g., transactions, instances, and the like). In the example at user interface 100, the selection of block usage 104 for the selected natural person 102 (which in this example is Jane Green) generates metadata that is mapped to the data objects containing the blocked natural person's data. This metadata may be provided to the data warehouse storing the natural persons data. In some instances, the blocked natural person data is not be removed (e.g., deleted) from the data warehouse but rather blocked so that a new process cannot access the blocked natural person's data contained in the data warehouse.

To illustrate further, the metadata indicating that the natural person's data is blocked may prevent a new process from retrieving, accessing, viewing, querying, transferring, navigate to, and/or performing other new operations on the blocked natural persons data contained in the data warehouse. The blocking may thus prevent the natural person data from being provided to other web services, devices, applications, and the like. In some implementations however, the blocked natural person data may be accessible to an administrator that can access and/or manage (e.g., block or unblock) the blocked natural persons data.

FIG. 1B depicts a window 150 at which a confirmation can be made by selecting "Yes" 152. For example, after block usage is selected at 104, window 150 is generated and is displayed. When Yes 152 is selected, the master data stored in a data warehouse is modified to include metadata to prevent the blocked natural person's data, such as Jane Green's data, from being accessed for subsequent processes. Although the blocked data may still be stored in the data warehouse, when a transaction such as a view or other type of query requests data that includes the blocked data, the metadata (which indicates the block) prevents the blocked data from being accessed. Instead, the data warehouse instead returns an indication that the data is blocked, such as masked. In some embodiments, the metadata indicating the block may be at a root node of a data structure containing the blocked person's data. As noted in Table 1, the metadata for the blocked natural person may include a value of "1" indicating that all data associated with Jane Green for example should be blocked.

Figure 2:
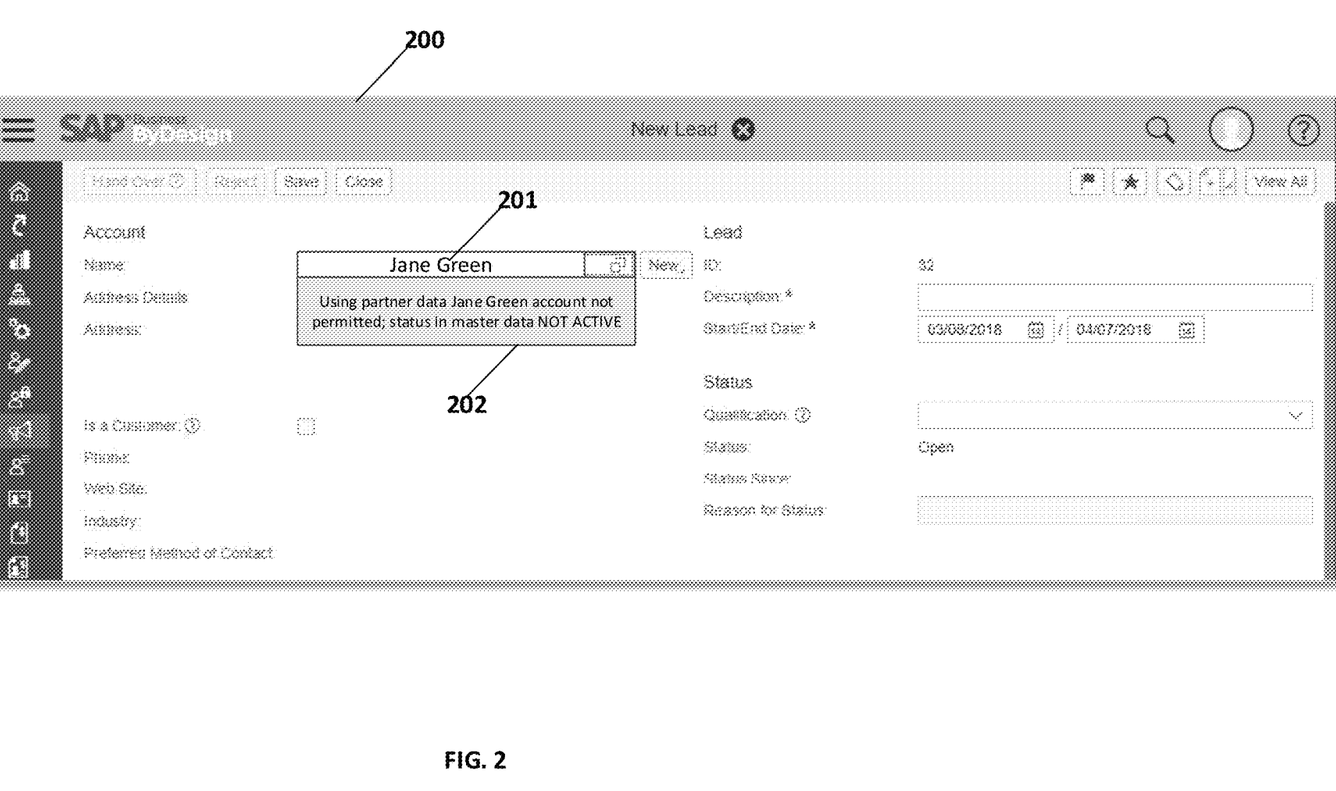
FIG. 2 depicts an example of a user interface indicating blocked natural persons data.

FIG. 2 depicts a user interface 200 associated with a new process, such as a new lead user interface. This new transaction requests information associated with a blocked natural person, such as Jane Green 201, who was blocked at FIGS. 1A-B. When blocked, the view instance (e.g., one or more queries and other operations to obtain the data for the user interface 200 from master data at a data warehouse) returns an indication that at least a portion of the requested data is blocked. In this example, the indication of blocking is presented as value help 202 to indicate that the requested data is blocked (e.g., "not permitted" or "not active"). If there is an existing report that includes any data associated with the blocked natural person, the existing report may remain visible but without the blocked natural person data, which in this example is data associated with Jane Green.

Figure 3:
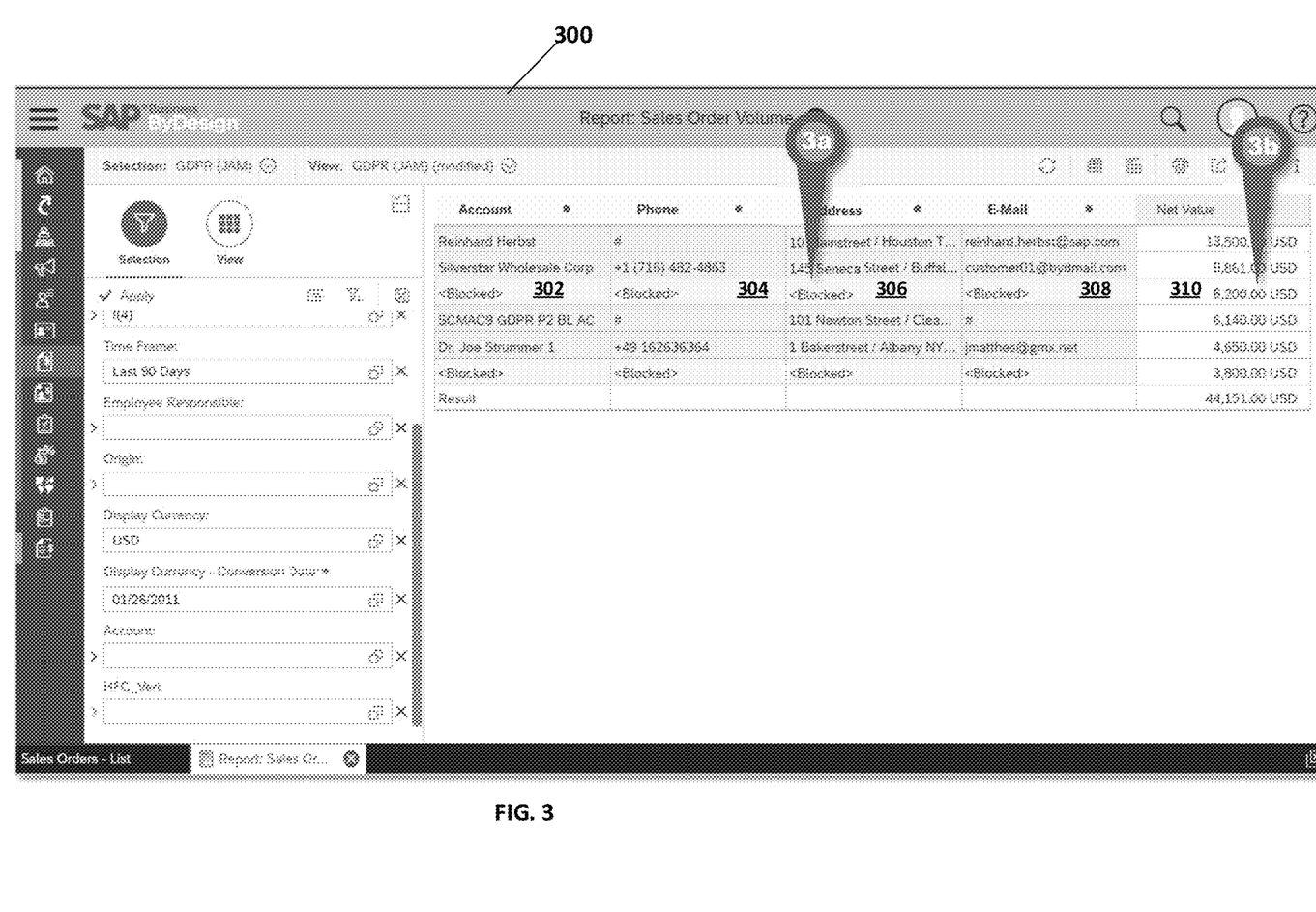
FIG. 3 depicts an example of a report including a portion of the report indicating blocked natural persons data.

FIG. 3 depicts an example of an existing report 300 presented at a user interface. The report blocks access to data elements 302-308. In this example, key figure information may be presented as shown at 310, so the Net Value at 310 may remain unblocked to allow the key figure result of $44,151.00 to remain stable. In some embodiments, the code list of Table 1 may indicate to the data warehouse whether some fields, such as key figure data such as the net value of FIG. 3, can be accessed for a blocked natural person. In some embodiments, the data warehouse may allow the key figure data for a blocked natural person to be accessed and returned as a result set for a view, while blocking other data associated with the blocked natural person. As noted, one or more fields may be grouped as blocked fields for the blocked natural person, while one or more other fields may be grouped as not blocked fields for the blocked natural person. In some embodiments, the data warehouse may allow the key figure data to be accessed for a blocked natural person but the key figure data may be rounded or anonymized, although the data warehouse may also provide this information without such anonymizing or rounding as well. In some embodiments, the code list of Table 1 may indicate to the data warehouse whether, for a given blocked natural person, a field, such as key figure data, should be provided as a rounded or anonymized value.

Figure 4:
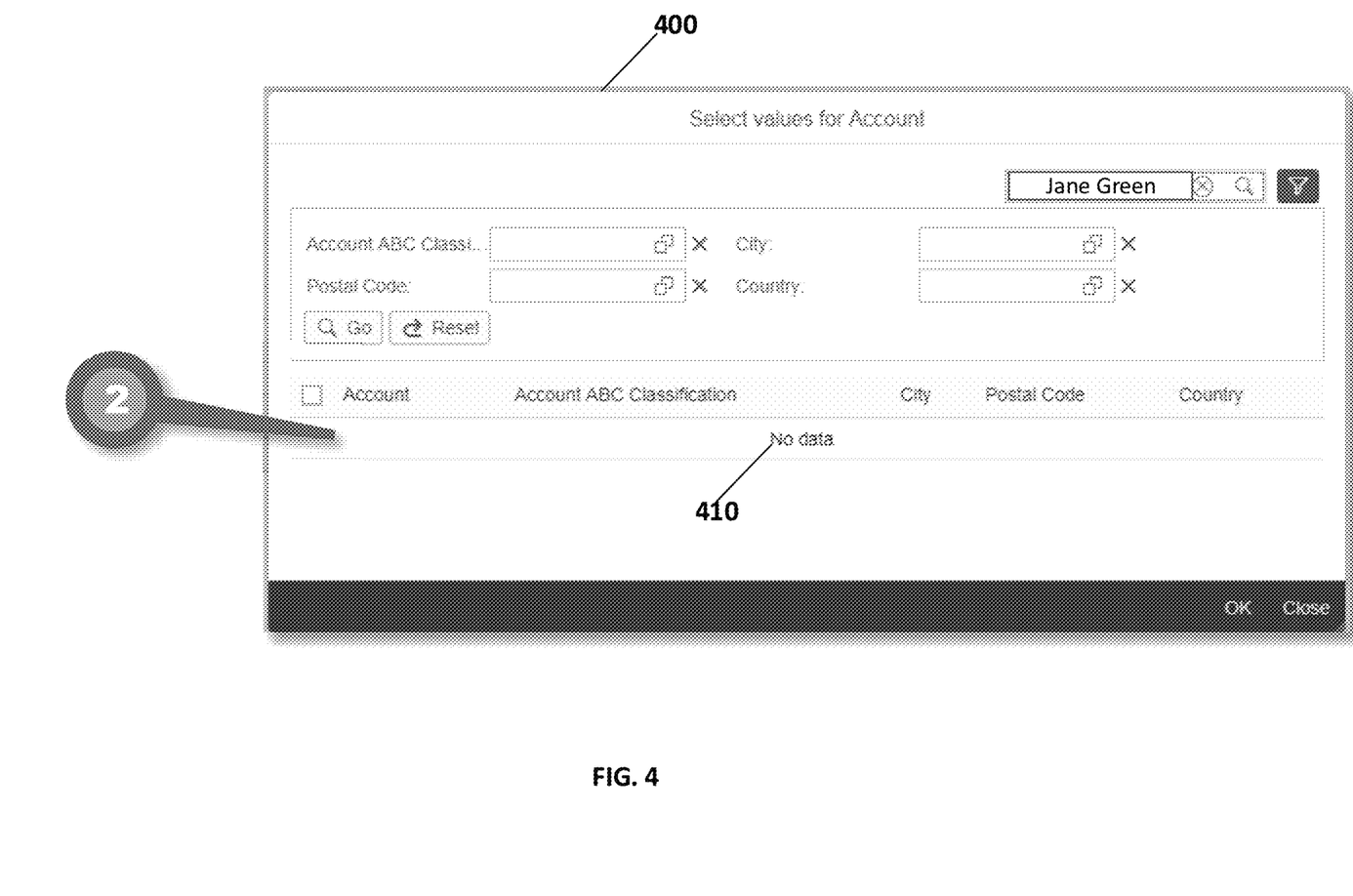
FIG. 4 depicts another example of a report indicating blocked natural persons data.

As noted, the blocked natural persons data will not be allowed to be transmitted out of the data warehouse storing the master data, so client devices will not be able to obtain or access the blocked natural persons data for new processes as noted above. And, the blocked natural persons data may inhibit navigation to the blocked data. For example, selecting the blocked account at 302 navigates to user interface 400 at FIG. 4 where "No data" 410 for the blocked natural person (which is Jane Green in this example) is shown.

FIG. 5 depicts a user interface 500 at which blocking runs may be configured. As noted, an administrator responsible for data privacy and/or GPDR may access user interface 500 to configure blocking runs. For example, blocking runs for blocked natural persons may be periodically run to check whether the blocking is obsolete 505, in revision 515, or finished 520. The user interface 500 enables configuration of the frequency 530 of the blocking runs, such as daily, yearly, etc. The user interface enables configuring how long an entity needs to be in obsolete status before the entity gets blocked by the run. And as noted, natural persons data will not be usable for new processes, transactions, reporting, etc., although as noted existing reports may be accessible with the blocked information masked as shown at FIG. 3, for example.

Figure 6:
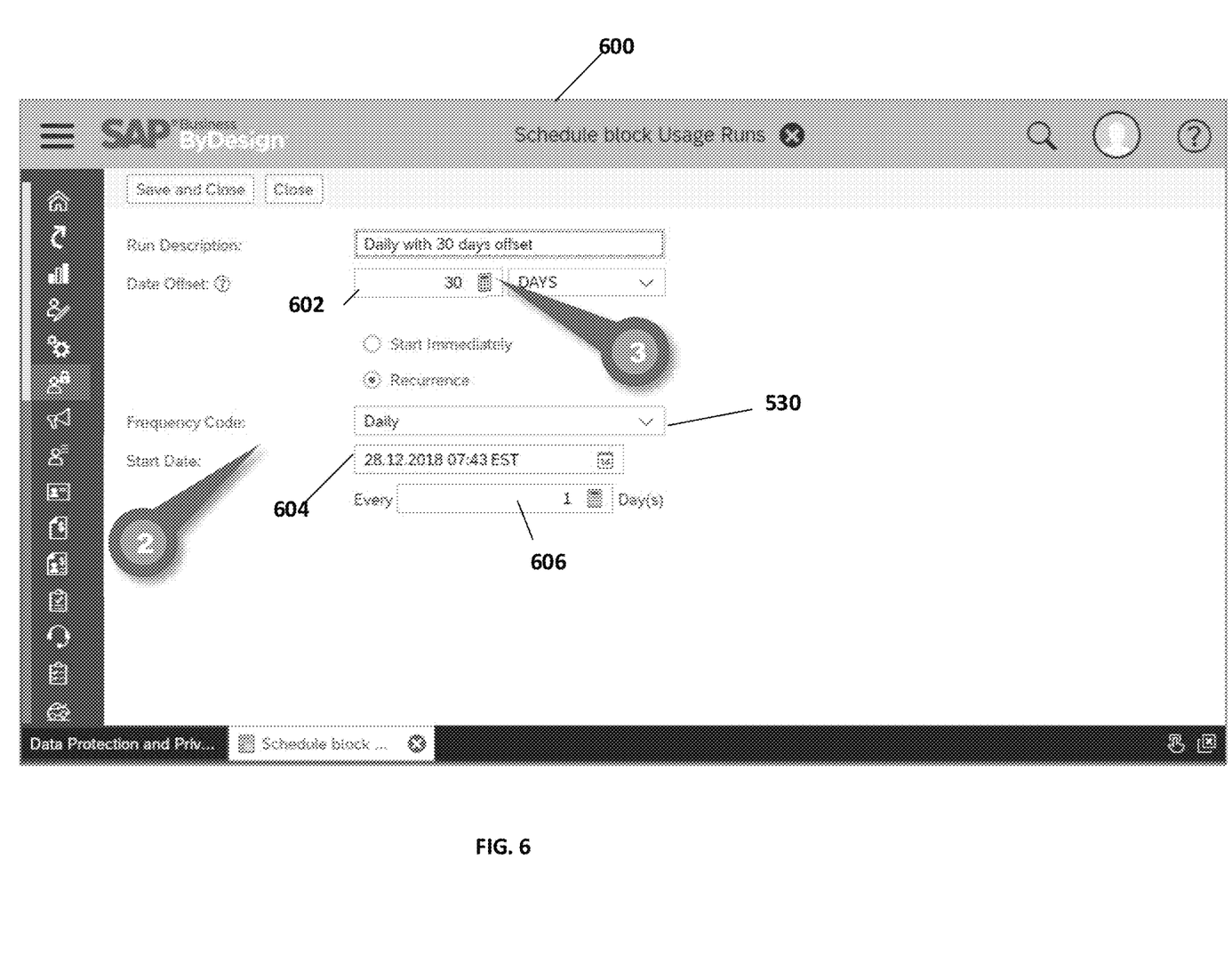

FIG. 6 depicts a user interface 600 at which the run frequency 530 can be configured. As noted, an administrator responsible for data privacy may access user interface 600 to configure blocking runs as shown at user interface 600. In the example of FIG. 6, the daily run can be configured with an offset 602, a start date 604, and the recurrence 606.

Figure 7:
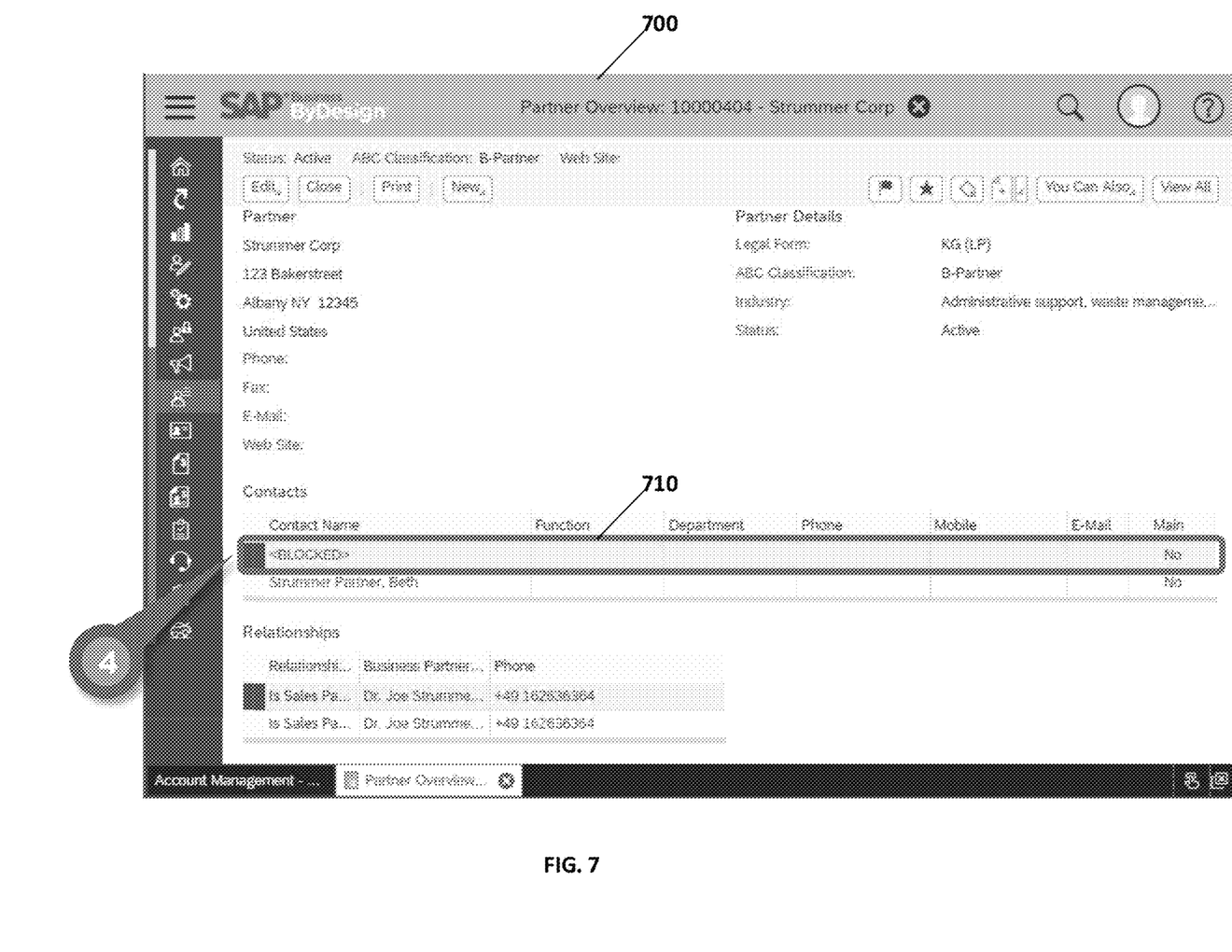
FIG. 7 depicts another example of a report including a portion of the report indicating blocked natural persons data.

FIG. 7 depicts another example of a user interface 700 presenting an existing report for Strummer Corp. In this example, the existing report is still accessible but the view (which obtains from the data warehouse the data for the report) cannot obtain the blocked natural persons data which is shown as BLOCKED 710. To illustrate further, a database view may query a database for the information to populate the report. The view in this case is sent towards a database or data warehouse. When it is determined that the result set for the view includes blocked natural person data (as determined by metadata stored at the data warehouse), the data warehouse responds with the result set for the view but does not allow the blocked data to leave the data warehouse. Instead, the result set includes an indication that the natural person data is blocked.

Figure 8:
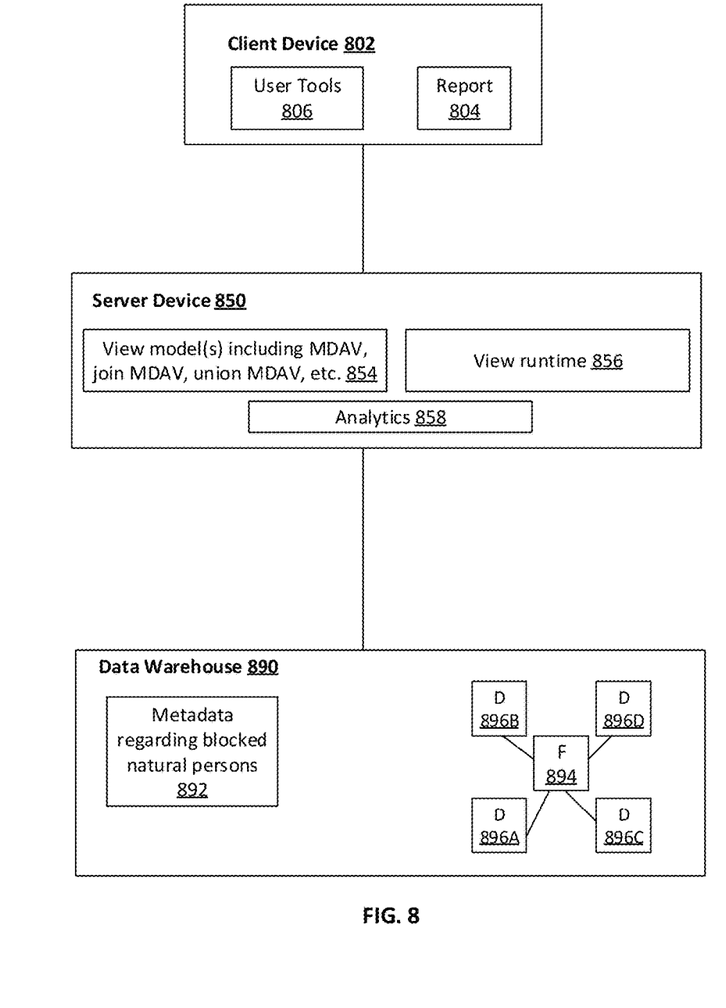
FIG. 8 depicts an example of a system configured to block natural persons data from being accessed at a data warehouse.

FIG. 8 depicts an example of a system 800, in accordance with some example embodiments. The system 800 includes a data warehouse 890 coupled to a server 850, which is further coupled to a client device 802.

The data warehouse 890 may store master data, which may be structured in the form of a database. In some embodiments, the master data may be stored in a star schema as shown by the fact table(s) 894 and corresponding dimension table(s) 896A-D. In some embodiments, the data warehouse may include metadata 892 linked to the master data to indicate whether portions of the master data correspond to blocked natural persons data. In some embodiments, the metadata may be included in a root node of a data structure including the blocked natural persons data. Returning to the previous example, a data structure for Jane Green may include a root node containing an indication of whether Jane Green's natural person information is blocked. The indication may take the form of the code list at Table 1 above. As such, when a request for data is received, the data warehouse can respond to the request with a result set but exclude the blocked natural persons data.

The client device 802 may include a user interface which can be used to view one or more reports, for example report 804. Each report may be mapped to a view at view model repository 854. For example, the report at FIG. 3 may be mapped to a view model at 854. The view model defines the queries and other operations (e.g., unions, joins, and the like) needed to provide the data shown at 300. To illustrate, when a user of the client device 802 instantiates a report 300, this triggers the server device 850 to run during view runtime 856 the corresponding view which sends queries to the data warehouse 890 for the data needed for the report. The server device 850 may also include analytics 858 which may perform multi-dimensional analytics. The server device 850 may also be configured to perform multi-dimensional analytical views and complex operations, such as joins, unions, anchors, etc. on the result set returned by the data warehouse. These operations may also take into account the blocked natural persons data and show that data as blocked in the results returned to the client device 802 including report 804.

The client device 802 may also include user tools to configure the blocked natural persons as shown at FIGS. 1A, 1B, 5, and 6, which is provided as metadata at 892.

Figure 9:
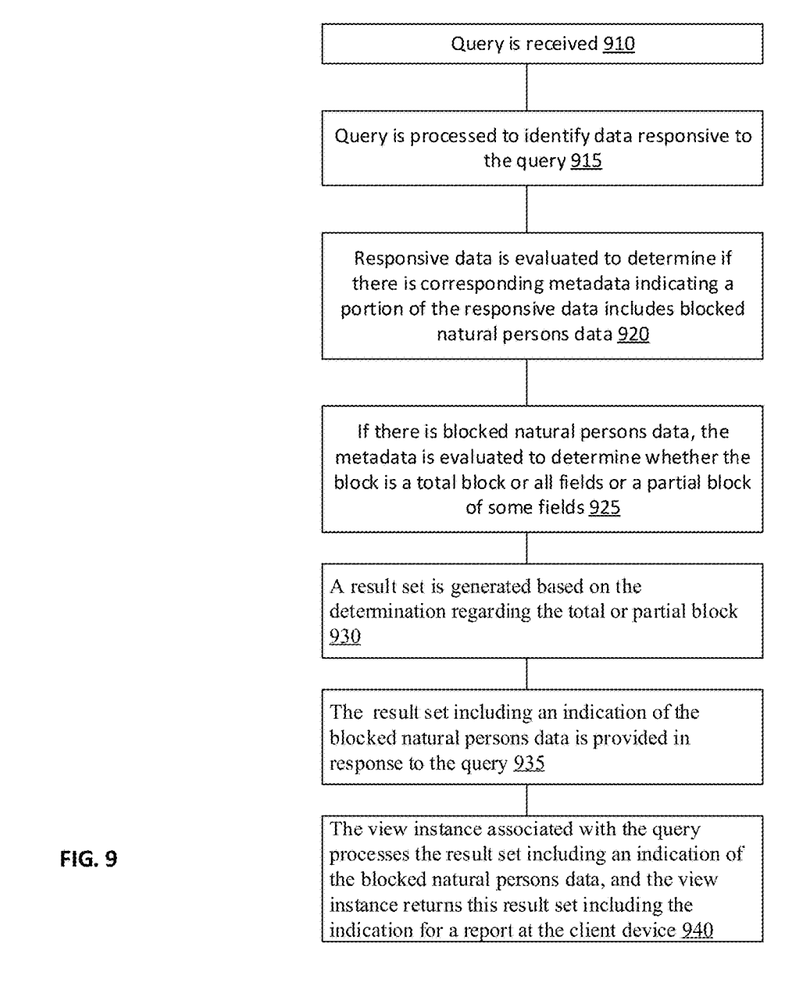
FIG. 9 depicts an example of a process for blocking natural persons data.

FIG. 9 depicts an example of a process, in accordance with some example embodiments. The description of FIG. 9 also refers to FIG. 8.

At 910, a query is received at the data warehouse. For example, report 804 may have a pre-defined database view stored at 854. During the view runtime 856, the view sends one or more queries to the data warehouse 890 to obtain a result set for the view and the corresponding report 804.

At 915, the query is processed to identify data responsive to the query. The data warehouse 890 may process the query associated with the view to determine which data objects are needed to form a result set responsive to the query.

At 920, the responsive data is evaluated to determine if there is any corresponding metadata indicating a portion of the responsive data includes blocked natural persons data. For example, the data warehouse may check for codes, such as the code "1" at Table 1, to determine that all the data fields are to be blocked as blocked natural persons data.

If there is blocked natural persons data, the metadata is evaluated, at 925, to determine whether the block is a total block or all fields or a partial block of some fields. As noted with respect to Table 1 at code "1", the block may be a block of all of the data fields associated with the blocked natural persons data. Alternatively, the block may be a block of a group of the data fields associated with the blocked natural persons data, while another group of the data fields associated with the blocked natural persons data is not blocked (see, e.g., Table 1 at code "2"). At 930, a result set is generated based on the determination at 920. The data determined to be responsive is included in the result set, but data objects being blocked as blocked natural persons data is not included in the result set. Instead, the result set my include a predetermined value, such as "X", to indicate that the data is blocked natural persons data. In this way, the blocked natural persons data, although stored at the data warehouse, does not traverse the data warehouse's interfaces to other client devices 802 or server devices 850.

At 935, the result set including an indication of the blocked natural persons data is provided in response to the query. The data warehouse 890 may then provide the result set responsive to the query to the server device 850. The result set may include the predetermined value, such as "X", to indicate that the result set includes data that is blocked natural persons data.

At 940, the view instance associated with the query processes the result set including the indication of the blocked natural persons data, and the view instance returns this result set including the indication for a report at the client device. For example, the server device 850 may receive and process (e.g., perform other operations) the result set including the indication of the blocked natural persons data. The runtime view instance may then return this result set including the indication for a report 804 at the client device.

As noted, the client device 802 may provide user interfaces at which metadata indicative of whether a natural person's data is being blocked. When that metadata is generated, the metadata is provided to the data warehouse 890, so that the data warehouse can map that metadata to the corresponding data objects.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving, at a data warehouse, a query from a server device including a model repository storing a database view, which in response to a client device request for a report, causes the query to be sent to and received by the data warehouse to enable blocking certain natural persons data, wherein the query obtains data for the report being generated for the server device, wherein the database view comprises a pre-defined database view stored at the model repository at the server device that is separate from the data warehouse, wherein the pre-defined database view is configured to send one or more pre-defined queries to the data warehouse to obtain the result set;
processing, by the data warehouse, the query to identify data responsive to the query, wherein the query processing at the data warehouse further comprises:
evaluating the identified responsive data to determine whether there is corresponding metadata indicating a portion of the identified responsive data includes blocked natural persons data, wherein the metadata is stored at the data warehouse and is linked to the identified responsive data;
when the blocked natural persons data is determined, evaluating the corresponding metadata to determine whether the block is a total block or a partial block, wherein the partial block allows key figure data, included in the identified responsive data, to be included in a result set, the key figure data providing an accurate numerical answer despite the partial block;
in response to the partial block being determined, generating, based on the evaluated metadata, the result set including a predetermined value to mask the blocked natural persons data and to prevent the blocked natural persons data from being transmitted from the data warehouse to other devices including the server device, wherein the result set further includes key figure data associated with the blocked natural persons data;
in response to the partial block being determined, providing, to the server device, the generated result set including the predetermined value to mask the blocked natural persons data and further including the key figure data; and
in response to the total block being determined, generating, based on a run time query filter, the result sent with at least one instance corresponding to the blocked natural persons data removed from the result set and providing, to the server device, the generated result set without the at least one instance removed by the run time query filter.

2. The method of claim 1, wherein the database base view comprises a multi-dimensional analytical view including as an element the runtime query filter.

3. The method of claim 1, wherein the processing further includes processing the query associated with the database view to determine which data objects are needed to form the result set responsive to the query.

4. The method of claim 1, wherein the query is a multi-dimensional query.

5. The method of claim 4, wherein the data objects are structured in a star schema including a fact table and one or more dimension tables.

6. The method of claim 1, wherein the evaluation further comprises determining that the corresponding metadata includes a code value indicative of the partial block that allows the key figure data.

7. The method of claim 1, wherein the data warehouse comprises a multi-dimensional database and/or a database.

8. The method of claim 1, wherein the pre-defined database view is a multi-dimensional analytical view, and wherein the metadata comprises at least a first code value and a second code value, wherein the first code value indicates the total block and the second code value indicates the partial block, that allows key figure data to be provided to the server device as part of the generated result set.

9. A system comprising:
at least one processor; and
at least one memory including program code which when executed by the at least one processor causes operations comprising:
receiving, at a data warehouse, a query from a server device including a model repository storing a database view, which in response to a client device request for a report, causes the query to be sent to and received by the data warehouse to enable blocking certain natural persons data, wherein the query obtains data for the report being generated for the server device, wherein the database view comprises a pre-defined database view stored at the model repository at the server device that is separate from the data warehouse, wherein the pre-defined database view is configured to send one or more pre-defined queries to the data warehouse to obtain the result set;

processing, by the data warehouse, the query to identify data responsive to the query;

evaluating the identified responsive data to determine whether there is corresponding metadata indicating a portion of the identified responsive data includes blocked natural persons data, wherein the metadata is stored at the data warehouse and is linked to the identified responsive data;

when the blocked natural persons data is determined, evaluating the corresponding metadata to determine whether the block is a total block or a partial block, wherein the partial block allows key figure data, included in the identified responsive data, to be included in a result set, the key figure data providing an accurate numerical answer despite the partial block;

in response to the partial block being determined, generating, based on the evaluated metadata, the result set including a predetermined value to mask the blocked natural persons data and to prevent the blocked natural persons data from being transmitted from the data warehouse to other devices including the server device, wherein the result set further includes key figure data associated with the blocked natural persons data;

in response to the partial block being determined, providing, to the server device, the generated result set including the predetermined value to mask the blocked natural persons data and further including the key figure data; and in response to the total block being determined, generating, based on a run time query filter, the result sent with at least one instance corresponding to the blocked natural persons data removed from the result set and providing, to the server device, the generated result set without the at least one instance removed by the run time query filter.

10. The system of claim 9, wherein the database base view comprises a multi-dimensional analytical view including as an element the runtime query filter.

11. The system of claim 9, wherein the processing further includes processing the query associated with the database view to determine which data objects are needed to form the result set responsive to the query.

12. The system of claim 9, wherein the query is a multi-dimensional query.

13. The system of claim 12, wherein the data objects are structured in a star schema including a fact table and one or more dimension tables.

14. The system of claim 9, wherein the evaluation further comprises determining that the corresponding metadata includes a code value indicative of the partial block that allows the key figure data.

15. The system of claim 9, wherein the data warehouse comprises a multi-dimensional database and/or a database.

16. A non-transitory computer-readable storage medium including program code which when executed by at least one processor causes operations comprising:

receiving, at a data warehouse, a query from a server device including a model repository storing a database view, which in response to a client device request for a report, causes the query to be sent to and received by the data warehouse to enable blocking certain natural persons data, wherein the query obtains data for the report being generated for the server device, wherein the database view comprises a pre-defined database view stored at the model repository at the server device that is separate from the data warehouse, wherein the pre-defined database view is configured to send one or more pre-defined queries to the data warehouse to obtain the result set;

processing, by the data warehouse, the query to identify data responsive to the query;

evaluating the identified responsive data to determine whether there is corresponding metadata indicating a portion of the identified responsive data includes blocked natural persons data, wherein the metadata is stored at the data warehouse and is linked to the identified responsive data;

when the blocked natural persons data is determined, evaluating the corresponding metadata to determine whether the block is a total block or a partial block, wherein the partial block allows key figure data, included in the identified responsive data, to be included in a result set, the key figure data providing an accurate numerical answer despite the partial block;

in response to the partial block being determined, generating, based on the evaluated metadata, the result set including a predetermined value to mask the blocked natural persons data and to prevent the blocked natural persons data from being transmitted from the data warehouse to other devices including the server device, wherein the result set further includes key figure data associated with the blocked natural persons data;

in response to the partial block being determined, providing, to the server device, the generated result set including the predetermined value to mask the blocked natural persons data and further including the key figure data; and in response to the total block being determined, generating, based on a run time query filter, the result sent with at least one instance corresponding to the blocked natural persons data removed from the result set and providing, to the server device, the generated result set without the at least one instance removed by the run time query filter.

17. The non-transitory computer-readable storage medium of claim 16, wherein the database base view comprises a multi-dimensional analytical view including as an element the runtime query filter.

18. The non-transitory computer-readable storage medium of claim 16, wherein the processing further includes processing the query associated with the database view to determine which data objects are needed to form the result set responsive to the query.

19. The non-transitory computer-readable storage medium of claim 16, wherein the query is a multi-dimensional query.

* * * * *